(12) United States Patent
Miller et al.

(10) Patent No.: US 10,775,884 B2
(45) Date of Patent: Sep. 15, 2020

(54) GAZE CALIBRATION VIA MOTION DETECTION FOR EYE MOUNTED DISPLAYS

(71) Applicant: Spy Eye, LLC, Los Gatos, CA (US)

(72) Inventors: Gregory David Miller, San Jose, CA (US); Brian Elliot Lemoff, Morgan Hill, CA (US)

(73) Assignee: Tectus Corporation, Saratoga, CA (US)

( * ) Notice: Subject to any disclaimer, the term of this patent is extended or adjusted under 35 U.S.C. 154(b) by 144 days.

(21) Appl. No.: 15/977,985

(22) Filed: May 11, 2018

(65) Prior Publication Data
US 2018/0335836 A1  Nov. 22, 2018

Related U.S. Application Data

(60) Provisional application No. 62/507,862, filed on May 18, 2017.

(51) Int. Cl.
| | | |
|---|---|---|
| *G06F 3/01* | (2006.01) | |
| *G02B 27/01* | (2006.01) | |
| *G02C 7/04* | (2006.01) | |
| *G06T 19/00* | (2011.01) | |
| *G09G 3/00* | (2006.01) | |
| *G02C 11/00* | (2006.01) | |

(52) U.S. Cl.
CPC ......... *G06F 3/013* (2013.01); *G02B 27/017* (2013.01); *G02C 7/04* (2013.01); *G02C 11/10* (2013.01); *G06F 3/011* (2013.01); *G06T 19/006* (2013.01); *G09G 3/00* (2013.01); *G09G 2320/0693* (2013.01)

(58) Field of Classification Search
CPC ... G06F 3/013; G06F 3/011; G02C 7/04–049; G02B 27/017; G09G 2320/0693
See application file for complete search history.

(56) References Cited

U.S. PATENT DOCUMENTS

| | | |
|---|---|---|
| 6,851,805 B2 | 2/2005 | Blum et al. |
| 8,786,675 B2 | 7/2014 | Deering |

(Continued)

OTHER PUBLICATIONS

U.S. Appl. No. 15/570,707, filed Oct. 30, 2017, Inventor Miller, G.D. et al.

(Continued)

*Primary Examiner* — Michael Pervan
(74) *Attorney, Agent, or Firm* — Fenwick & West LLP

(57) ABSTRACT

An eye-mounted display can be calibrated relative to a user's gaze. A calibration system causes the eye-mounted display to project a calibration image onto the user's retina. The system detects eye movement as the user looks towards the calibration image. Once the detected eye movement indicates that the user's gaze is centered gaze on the calibration image, the system determines a calibration parameter representative of the user's gaze or the detected eye movement. The calibration parameter can be, for example, a pixel offset relative to an initial image source location or an image source pixel corresponding to the user's centered gaze. Subsequent images are then projected by the eye-mounted display onto the user's retina based on the calibration parameter.

25 Claims, 12 Drawing Sheets

(56) References Cited

U.S. PATENT DOCUMENTS

| | | |
|---|---|---|
| 8,971,978 B2 | 3/2015 | Ho et al. |
| 9,442,310 B2 | 9/2016 | Biederman et al. |
| 9,939,658 B1 | 4/2018 | Gutierrez et al. |
| 2014/0098226 A1 | 4/2014 | Pletcher et al. |
| 2015/0301338 A1* | 10/2015 | Van Heugten ........... G02C 7/04 345/8 |
| 2015/0362750 A1 | 12/2015 | Yeager et al. |
| 2016/0026245 A1* | 1/2016 | Mantiuk ................. G06F 3/013 382/103 |
| 2016/0097940 A1 | 4/2016 | Sako et al. |
| 2016/0134863 A1* | 5/2016 | Horesh ................ H04N 17/002 348/78 |
| 2016/0299354 A1 | 10/2016 | Shtukater |
| 2017/0023793 A1 | 1/2017 | Shtukater |
| 2017/0047051 A1 | 2/2017 | Deering |
| 2017/0371184 A1 | 12/2017 | Shtukater |

OTHER PUBLICATIONS

U.S. Appl. No. 15/725,059, filed Oct. 4, 2017, Inventor Zhang, H.

\* cited by examiner

GAZE CALIBRATION VIA MOTION DETECTION FOR EYE MOUNTED DISPLAYS

CROSS-REFERENCE TO RELATED APPLICATIONS

This application claims priority to and the benefit of U.S. Provisional Application No. 62/507,862, filed on May 18, 2017, the contents of which are hereby incorporated by reference in their entirety. This application is related to U.S. application Ser. No. 15/725,059, filed Oct. 4, 2017, the contents of which are hereby incorporated by reference in their entirety.

BACKGROUND

1. Technical Field

This disclosure relates generally to eye-mounted displays and, more particularly, to the calibration of eye-mounted displays.

2. Description of Related Art

An eye-mounted display has been proposed by Deering. See, e.g. U.S. Pat. No. 8,786,675, "Systems using eye mounted displays." One type of eye-mounted display includes a tiny projector (or "femtoprojector") mounted inside a contact lens. The projector projects images onto the retina of a person wearing the lens. A typical femtoprojector is no larger than about a millimeter in any dimension.

Eye-mounted displays can be used for augmented reality applications. In augmented reality applications, the images projected by the eye-mounted display change the way a user sees the external environment. For instance, the eye-mounted display can superimpose a virtual object sitting on top of a real-world object. Accordingly, calibrating the eye-mounted display may help improve augmented reality applications that require precision in displaying virtual objects.

BRIEF DESCRIPTION OF THE DRAWINGS

Embodiments of the disclosure have other advantages and features which will be more readily apparent from the following detailed description and the appended claims, when taken in conjunction with the accompanying drawings, in which:

Figure 1:
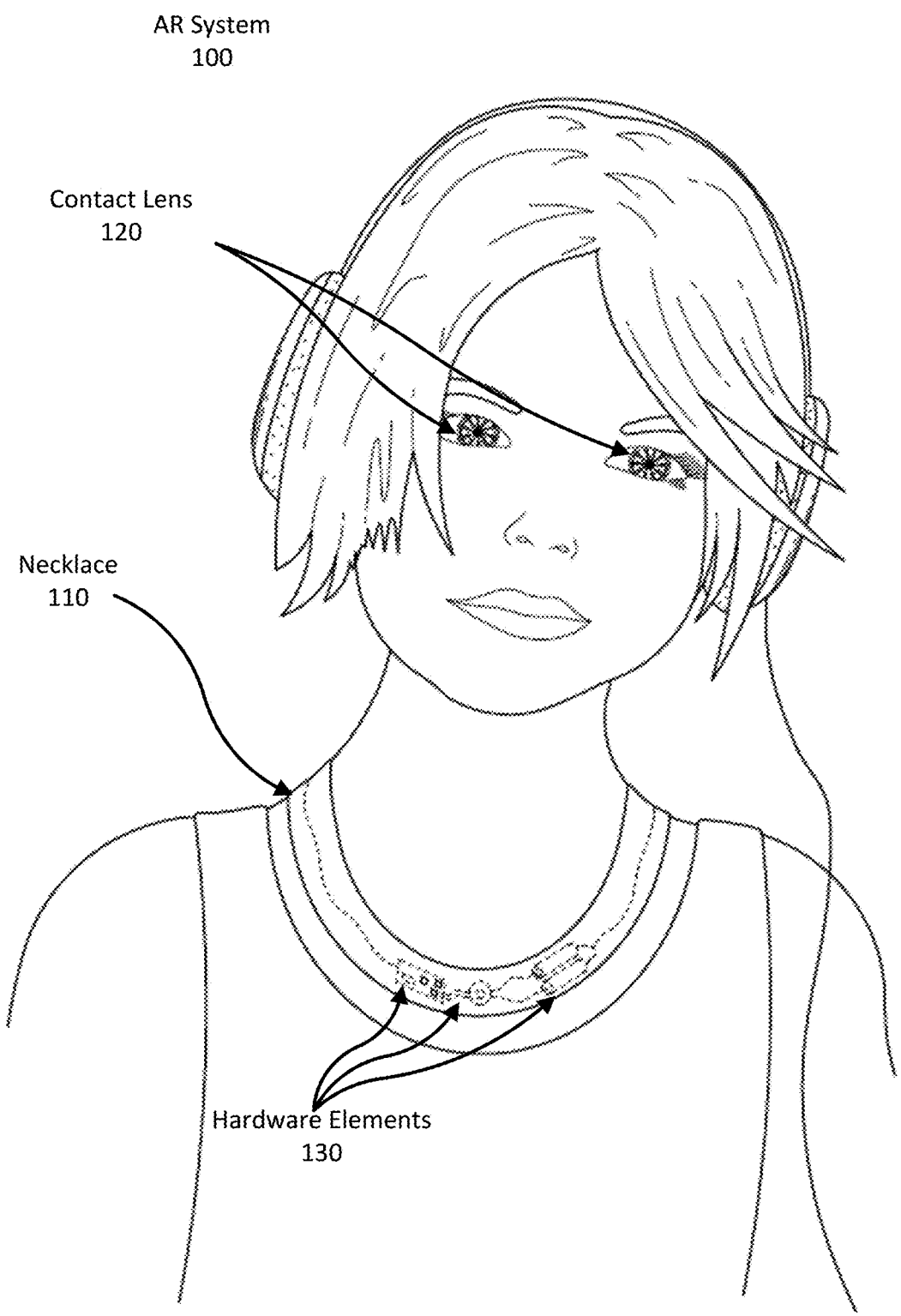
FIG. 1 is an illustration of user wearing an augmented reality system.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION OF THE PREFERRED EMBODIMENTS

Introduction

An augmented reality system can include an electronic contact lens with small projectors, such as femtoprojectors (see, e.g. U.S. Ser. No. 15/570,707 filed on Oct. 30, 2017 for examples of femtoprojector optical designs), to display virtual images to a user. The projectors project images onto the user's retina that are combined with external light passing through the contact lens from the user's environment. This enables a user to view virtual images within the real world.

If the projectors of the contact lens are misaligned with a user's gaze or visual axis, a virtual image can be displayed at an unintended location within the user's environment. For example, if a virtual image of a vase is intended to be displayed on a real-world table, misalignment with the user's gaze can cause the vase to float slightly over or to the side of the table.

The projectors of the contact lens can be calibrated with the user's gaze to prevent the misalignment of virtual images. A projector can project a calibration image from an initial location, such as an initial pixel within a pixel array of the projector estimated to align with the center of the user's fovea. The user's eye is monitored, and if a motion of the eye is detected in response to the calibration image, the projectors of the contact lens can be calibrated based on the detected motion. For simplicity, calibrating the projectors of the content lens is referred to simply as calibrating the contact lens below.

The calibration image can be held stationary relative to the user's external environment. In other words, if the calibration image is displayed off-center from a user's gaze and the user's gaze is shifted in order to look at the calibration image, the location from which the calibration image is projected can be shifted in an opposite direction in order to hold the calibration image stationary. Once the user's gaze at the calibration image is held steady, the shifted location from which the calibration image is projected can be determined to correspond to a center of the user's gaze. For instance, a particular pixel from a pixel array of the projector corresponding to the shifted location can be determined to correspond to the center of the user's gaze, and the contact lens can be calibrated based on the determined pixel. It should be noted that the calibration of a contact lens as described herein is separate from but can be combined with as the calibration procedures described in U.S. application Ser. No. 15/725,059.

The contact lens can also be calibrated by identifying a magnitude and direction of a user's eye movement in response to the calibration image. For instance, a pixel corresponding to the center of the user's gaze can be determined based on the magnitude and direction of the user's eye movement and based on an initial pixel from which the calibration image is projected.

Calibration images can be a single pixel, and the user can be prompted to center the pixel within the user's gaze. For instance, the user can be prompted via text displayed by the contact lens or audio signal to center the pixel. Alternatively, when the calibration image is displayed off-center from the user's gaze (e.g., the calibration image is projected away from the center of the user's fovea), the user may instinctively try to center the calibration image without being prompted.

The calibration image can be more than one pixel, but can include an obvious center or focal point, such as an image of a bullseye. The calibration image can also be a set of calibration images projected from different locations. For instance, different calibration images can be projected from multiple different pixels of the contact lens projectors, and the user can be prompted to look at the calibration image that most closely aligns with the center of the user's gaze. Likewise, the calibration image can be displayed by sequentially displaying a series of pixels to identify a pixel or location within a pixel array that requires the least amount of eye movement from the user, and thus the pixel or location that most closely aligns with the center of the user's gaze.

The contact lens can be calibrated during a dedicated calibration period, for instance at startup of the contact lens or periodically thereafter. The contact lens can also be calibrated in response to a user request, in response to determining that the contact lens is no longer calibrated, or in response to detecting eye movement patterns indicating that calibration is needed.

Once calibrated, subsequent images can be projected by the contact lens based on the calibration. For instance, a subsequent image can be projected at or relative to the pixel of a projector determined to correspond to the center of the user's gaze. Likewise, a subsequent image can be projected from a location based on an offset determined during calibration.

Electronic Contact Lens Architecture

Turning now to the figures, FIG. 1 shows a person wearing an augmented reality system 100 including a necklace 110 and an electronic contact lens 120 with an image source, such as one or more femtoprojectors. The contact lens 120 projects images onto the retina of the wearer to create an augmented reality. The necklace 110 and contact lens 120 are wirelessly coupled such that they can provide information to one another. For example, the necklace can provide images and information to the contact lens 120 to project onto the retina and the contact lens 120 provide motion information to the necklace 110.

The AR system of FIG. 1 does not disturb the wearer because the contact lenses 120 and the necklace 110 are similar to normal contacts lenses and necklaces used in everyday life. For example, the contact lenses 120 may also provide refractive eyesight correction and the necklace 110 may be designed to look like ordinary jewelry. When the AR system 100 is displaying images, reacting to speech or receiving messages, it may provide functions like those of a smartphone.

In FIG. 1, necklace 110 includes hardware elements 130 distributed about a band of the necklace 110 which allows for a broader range of necklace designs suitable to a variety of aesthetic tastes. In other configurations, the necklace includes hardware elements 130 localized to a pendant of the necklace. Generally, the pendant may be an ornamental object hanging from the necklace 110 that is configured to enclose and conceal the hardware elements 130 of the AR system 100.

While the AR system 100 is illustrated with a necklace 110, in other embodiments the functions of the necklace 110 described herein can be integrated into another type of wearable device. As an example, the functionality of the necklace 110 can be embedded in a necktie, a scarf, a belt, the brim of a hat, the collar of a shirt, the hood of a jacket, the sleeve of a sweater, the front of a t-shirt, etc. Alternatively, the necklace 110 can be coupled to an external electronic device (not pictured) such as a smart phone and the coupled electronic device may facilitate functionality of the AR system 100.

Figure 2:
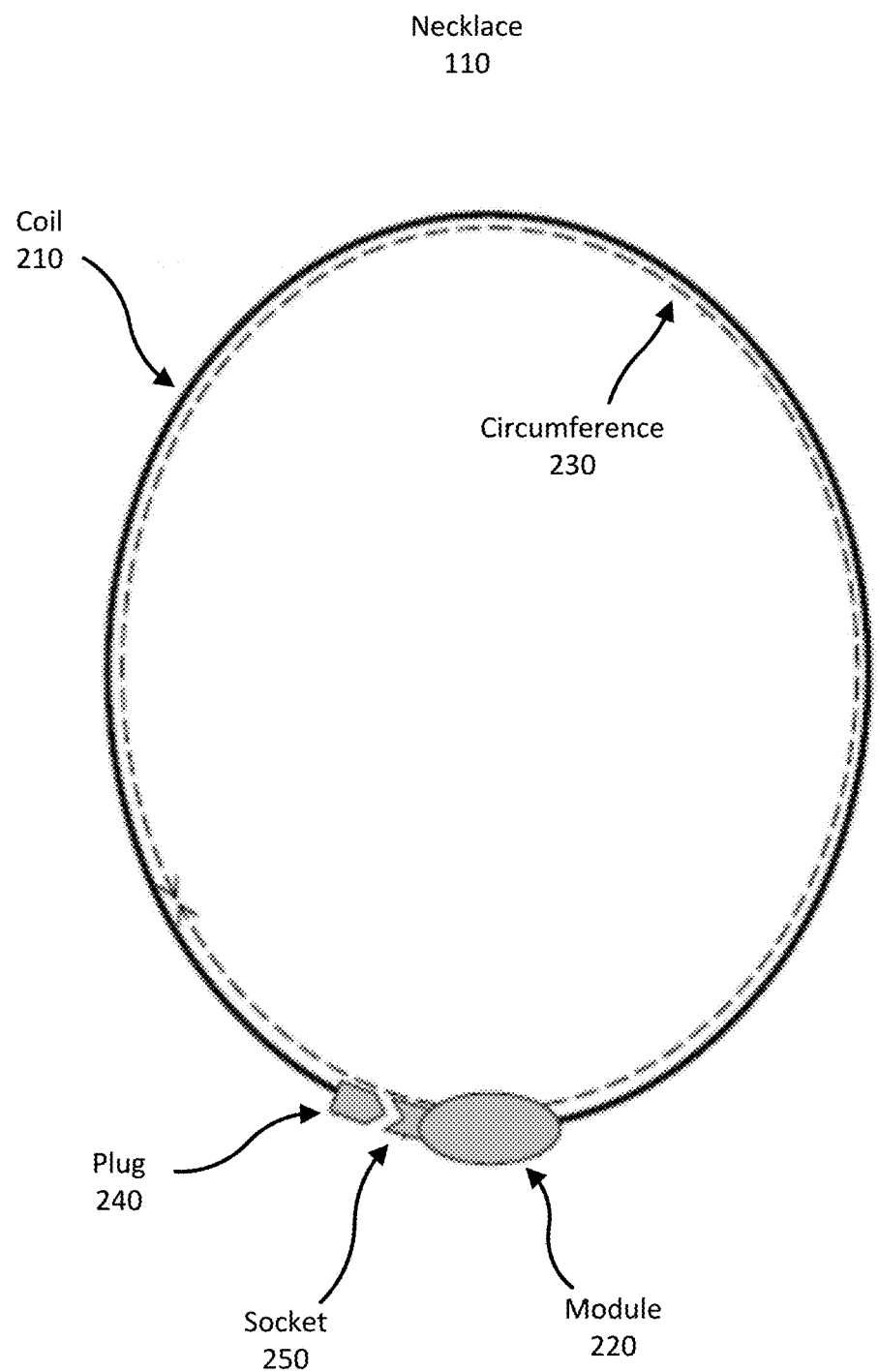
FIG. 2 is an illustration of a necklace of an augmented reality system.

FIG. 2 shows a necklace 110 of an unobtrusive augmented reality system 100. In the illustrated embodiment, the necklace 110 includes an electronic module 220 and a coil 210 of conductive material. The coil can be connected or disconnected with a plug 240 and a socket 250, or may be a single band and not include the plug and socket. Module 220 contains the hardware elements 130 for controlling the augmented reality system 100.

The necklace 110 includes various hardware elements 130 that enable functionality of the AR system 100. The hardware elements 130 can include one or more of: a power source such as a battery; a modulator to drive a radio-frequency current in the necklace coil that can be used to inductively couple to and communicate with the contact lens 120; a data modem to encode data on the radio-frequency signal; sensors such as microphones, cameras, inertial sensors, and GPS receivers; a cellular radio; a Wi-Fi radio; a Bluetooth radio; a graphics processing unit; and a microprocessor and memory. In various configurations, the hardware elements 130 can be included in module 220 and/or may be distributed about the necklace. Alternatively, when the AR system 100 is connected to an external electronic device, any of the sensors, processors and other components mentioned above may be located in the electronic device. The necklace 110 can implement a calibration procedure to calibrate the contact lens 120, for instance by instructing the contact lens to display a calibration image, to receive data indicative of eye movement, and to identify an alignment of a contact lens projector relative to the user's gaze or visual axis. Gaze is the direction in which one's visual axis is pointing. More robustly, a gaze is centered on the user's visual axis, which refers to the direction defined by the vector originating at an approximate center of the user's fovea and passing through an approximate center of the user's pupil. Note that due to the physical shape of an eye, a gaze may not be exactly centered on a user's visual axis. Calibration of the contact lens is described below in greater detail.

Figure 3A:
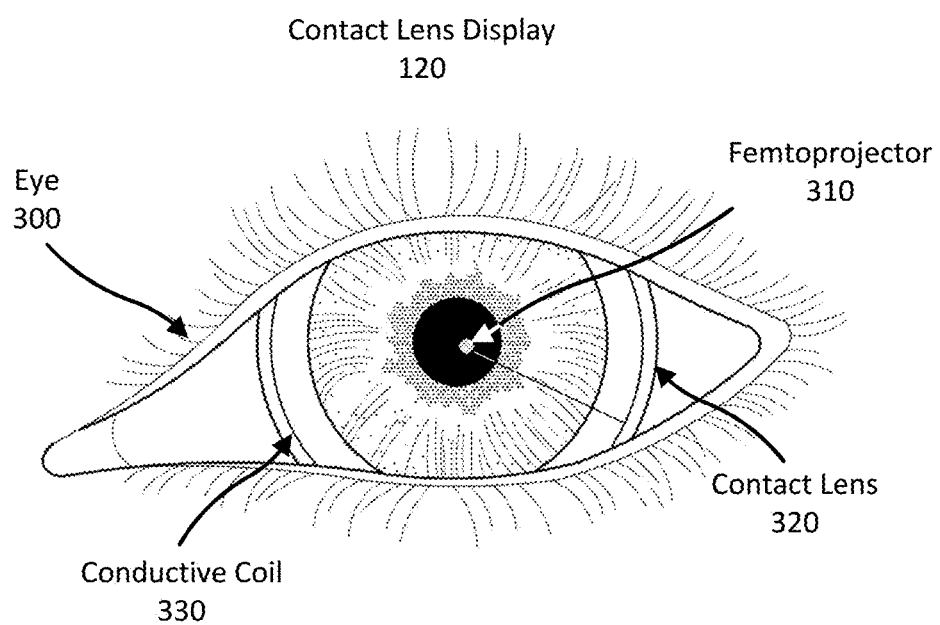
FIG. 3A is an illustration of an eye wearing a contact lens display of an augmented reality system.

FIG. 3A shows a contact lens 120 mounted on a person's eye 300. The contact lens 120 includes a femtoprojector 310 mounted in a contact lens 320, and a conductive coil 330 near the edge of the contact lens 320 for receiving power and/or data wirelessly from the necklace 110. The femtoprojector 310 may include electronics for harvesting power from the conductive coil 330 in the contact lens 320, processing data transmitted to the contact lens 120, and driving an image source inside the femtoprojector 310. In one example, the image source is an array of light emitters (e.g., an LED) that projects images onto a wearer's retina. The femtoprojector 310 can also include optical elements to modify the light that is projected.

Figure 3B:
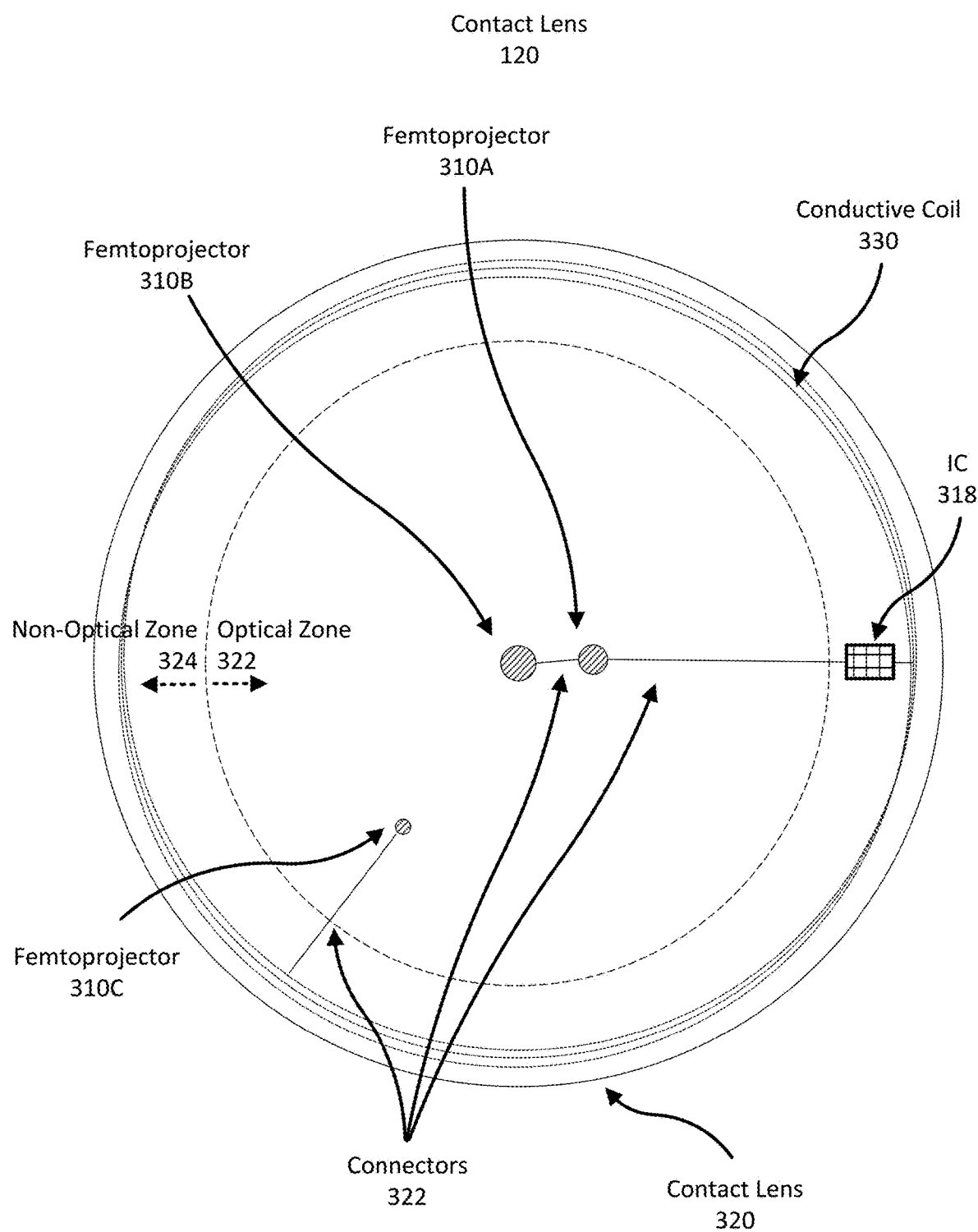
FIG. 3B is a plan view of a contact lens display.

FIG. 3B shows the contact lens 120 of FIG. 3A in more detail. FIG. 3B shows a plan view of a contact lens 120 with multiple femtoprojectors 310A-310C in a contact lens 320. The conductive coil 330 in the contact lens 320 may have between 1 and about 200 or more turns arranged in a spiral and which extend along a peripheral region of the contact lens 120. In other configurations, the conductive coil 330 can be arranged in a cylindrical coil or any other looped shape. The conductive coil 330 is connected to the femtoprojectors 310 and other electronics via embedded connectors 322. The femtoprojectors 310 are located in a central region of the contact lens 120 which is surrounded by the conductive coil 330. The contact lens 320 is between about 6 mm and about 25 mm in diameter and preferably between about 8 mm and about 16 mm in diameter.

FIG. 3B shows three femtoprojectors 310A-C in the contact lens 320, but many femtoprojectors (e.g., up to 50), or only one, may be mounted in such a contact lens 320. If there is only one femtoprojector 310 in a contact lens 320, it need not be in the center of the lens.

The entire display, made up of all the femtoprojectors 310, may be a variable resolution display that generates the resolution that each region of the eye can actually see, vastly reducing the total number of individual display pixels required compared to displays of equal resolution and field of view that are not eye-mounted. For example, a 400,000 pixel eye-mounted display using variable resolution can provide the same visual experience as a fixed external display containing tens of millions of discrete pixels.

In FIG. 3B, the contact lens 320 is roughly divided by the dashed circle into an optical zone 322 and a non-optical zone 324. Components in the optical zone 322 may be in the optical path of the eye 362, depending on how far open the iris is. Components in the non-optical zone 324 fall outside the aperture of the eye 340. Accordingly, active optical elements are generally positioned in the optical zone 322 and other elements are positioned in the non-optical zone 324. For example, femtoprojectors 310 are within the optical zone 322 while the conductive coil 330 is in the non-optical zone 324. Additionally, the contact lens 320 may also contain other components positioned in the non-optical zone 322 for data processing, data transmission, and power recovery and/or positioning. As an example, an integrated circuit (IC) 318 is positioned in the non-optical zone 324 and is connected to the femtoprojectors 310.

The contact lens 120 can also include other components such as antennae or optical/infrared photodetectors, data storage and buffering, controls, and a calibration system (including, for instance, a motion detection system and a display shift system). The contact lens 120 can include positioning components such as accelerometers used for motion detection, eye tracking, and head tracking. The contact lens 120 can also include data processing components, such as microprocessors, microcontrollers, and other data processing elements.

Figure 3C:
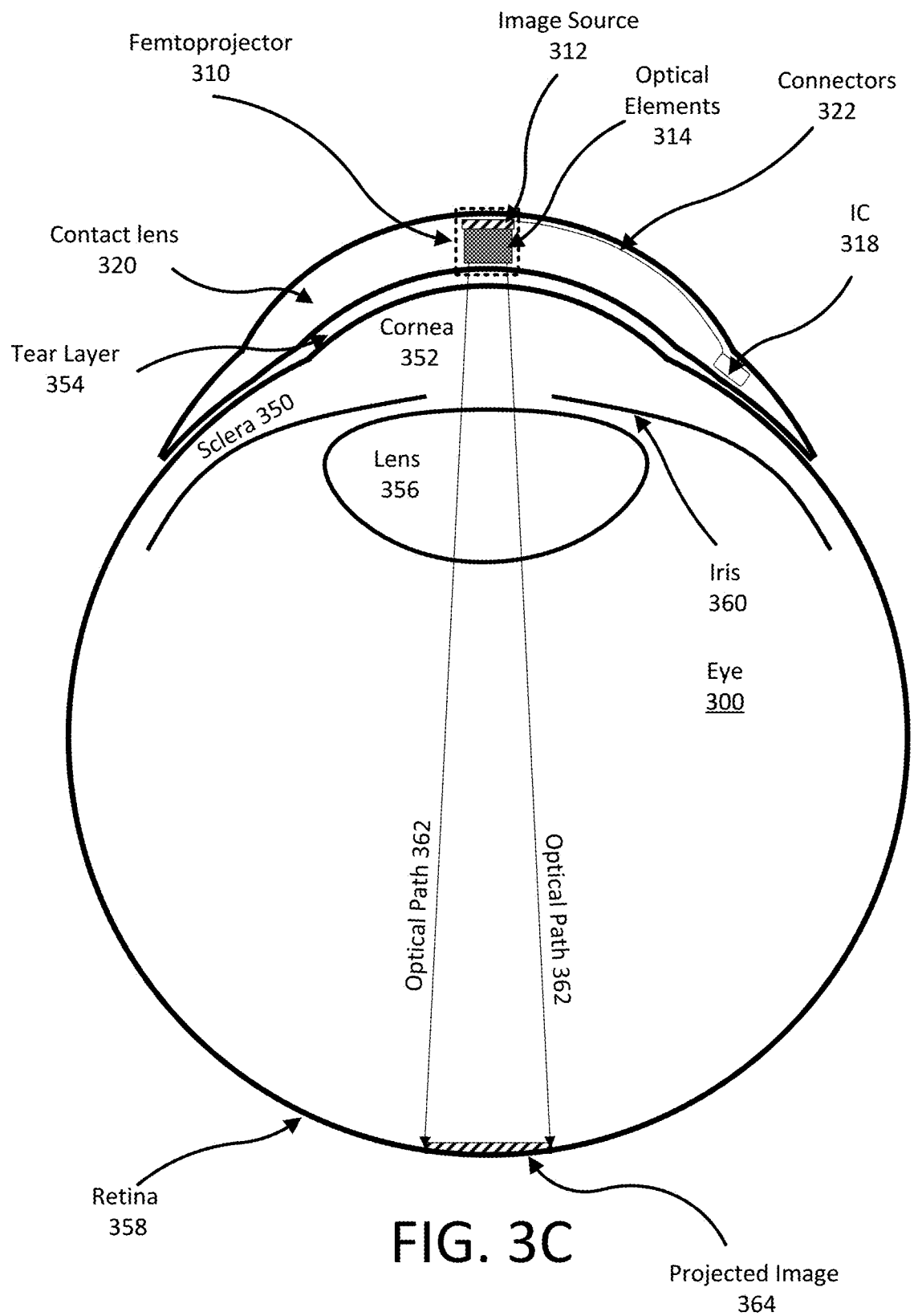
FIG. 3C is a cross-section of a contact lens display on an eye.

FIG. 3C shows a cross-sectional view of a contact lens 120 containing a femtoprojector 310 in a contact lens 320. FIG. 3C shows an embodiment using a scleral contact lens that makes contact with the sclera 350 of the eye 300, though other embodiments can include other suitable contact lens types. The contact lens 320 is separated from the cornea 352 of the user's eye 340 by a tear layer 354. The lens 356 of the eye focuses light entering the eye onto the retina 358. The iris 360 limits the aperture of the eye, that is, the amount of light that enters the lens 356.

The femtoprojector of FIG. 3C includes an image source 312 and optical elements 314. The image source 312 projects an image onto the retina 358 through the optical elements 314. The optical path 362 from the femtoprojector 310 to the image on the retina 358 is indicated by two arrows. The image 364 is projected onto the retina by the femtoprojector. The lens 356 of the eye 300 also focuses an image of the environment (i.e., an environment image, not illustrated in FIG. 3C) onto the retina 358. Therefore, the image the user sees when using the AR system 100 is a combination of the projected image 364 and the environment image.

Electronic Contact Lens Calibration

Figure 4:
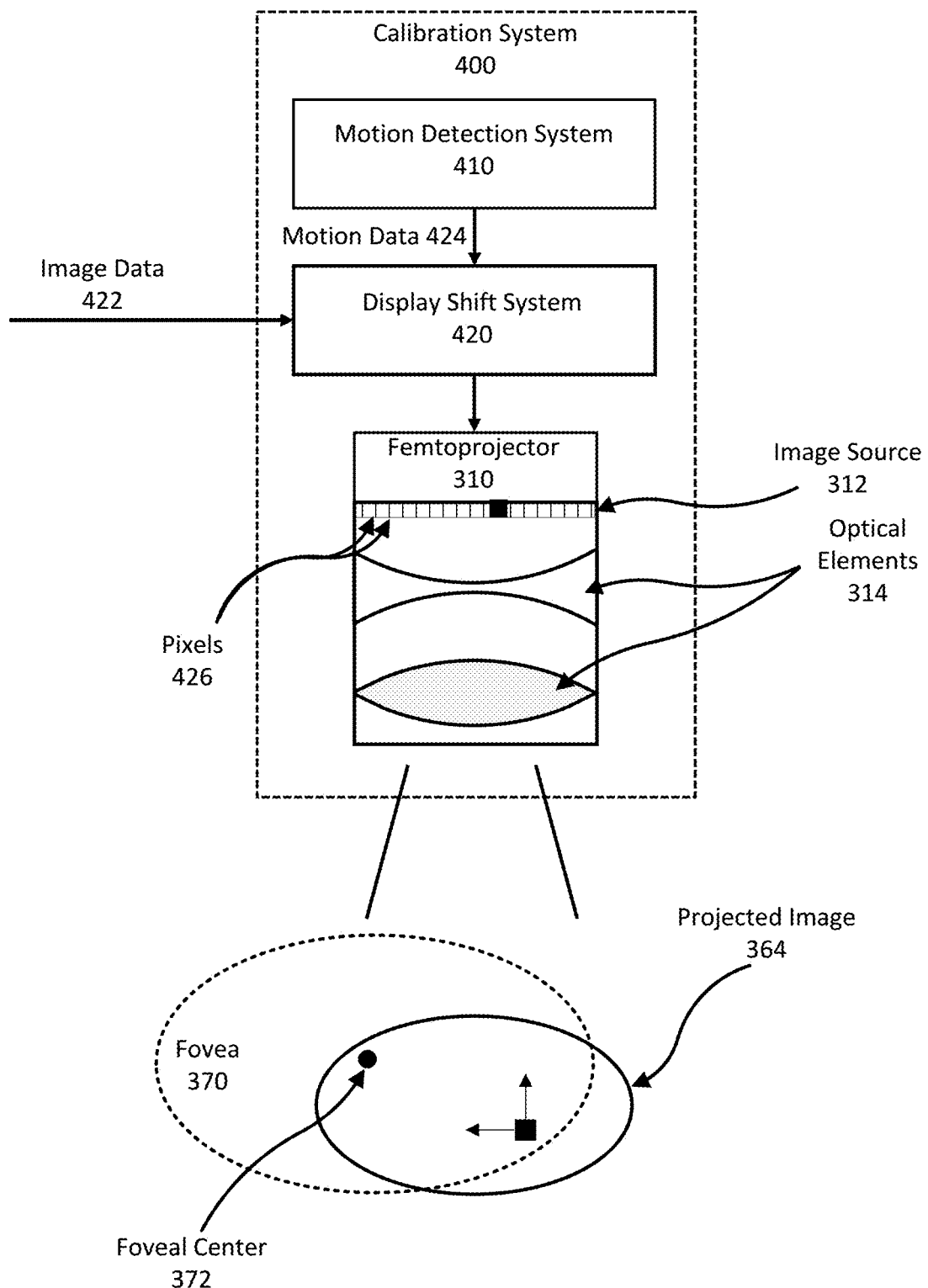
FIG. 4 is an illustration of a calibration system for the augment reality system.

FIG. 4 is a functional diagram of a calibration system 400 for an electronic contact lens. The calibration system 400 includes a femtoprojector 310 (which includes an image source 312 and optical elements 314), a motion detection system 410, and a display shift system 420. The display shift system 420 receives image data 422 for display by the contact lens 120 and motion data 424 from the motion detection system 420 representative of motion of a user's eye 300. The display shift system 420 then selects a location from within the image source 312 (such as a location of pixels 426 in an image source 312) from which to project the image data towards the user's retina. Although the calibration system 400 only includes one femtoprojector, in practice, the calibration system 400 can calibrate any number of femtoprojectors, for instance three monochrome femtoprojectors each corresponding to a different color, such as red, green, and blue.

The motion detection system 410 determines the position, velocity, and/or acceleration of an eyeball on which a contact lens is worn. Motion detection may be based on inertial sensors, optical sensors, electrical sensors, magnetic sensors and/or other sensors located in the contact lens and/or in peripheral equipment such as glasses, goggles, headwear, neckwear, clothing and/or external devices. The motion detection component can include an accelerometer, a gyroscope, an inertial measurement unit, a camera, or a magnetic measurement unit. Motion detection may involve forming a best estimate of eyeball position and velocity with the aid of a recursive Bayesian filter such as a Kalman filter. In some embodiments, the motion detection system 410 classifies detected eye motion as either saccade motion or smooth pursuit motion, for instance based on an acceleration or other characteristics of the eye motion.

The display shift system 420 selects a location within a pixel array of the image source 312 ("projection location") to display the image data. For instance, the display shift system 420 may select an initial location to display the image data. The display shift system 420, in response to detecting motion of the eye, may shift the selected projection location from the initial location in a direction opposite the detected motion. By shifting the projection location, the projected image data is kept stationary relative to the external environment. Likewise, the display shift system 420 may select a projection location to display the image data based on calibration information for the contact lens 120. For example, during calibration of the contact lens 120, it may be determined that a center of the user's gaze corresponds to a particular pixel, or "aligned pixel." In other words, during calibration, when the projection location is the aligned pixel, the projected image data is aligned with the user's gaze. Accordingly, the display shift system 420 may select a projection location to display image data relative to the aligned pixel.

The retina 358 also includes a fovea 370 with a foveal center 372. Generally, a person's visual acuity is highest at the fovea. Therefore, a projected image 364 on the foveal 370 region of the eye is clearer than when a projected image 364 is not on the fovea 370. Accordingly, it can be beneficial to calibrate the AR system 100 relative to the foveal center 372 (from which the visual axis extends) such that when a virtual object is intended to be displayed at a center of the user's gaze, the virtual object is projected onto the foveal center 372.

Figure 5A:
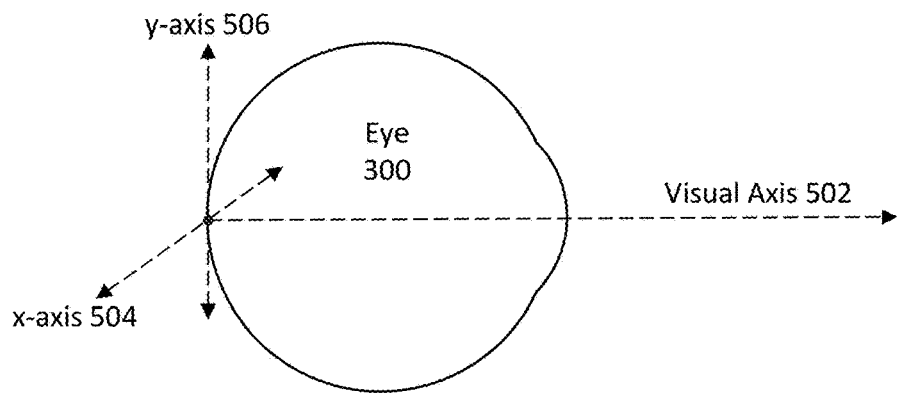
FIG. 5A is an illustration defining a user's visual field.

FIG. 5A shows one way to define a frame of reference for a user's perception of the external environment, referred to as a "visual field". A user's visual field includes everything they see in augmented reality, including both projected images and environment images. As a user's eye moves to look from object to object, the user's visual field correspondingly shifts. In other words, the user's visual field is a perceived image of their augmented reality.

In this example, the user's visual field is defined by an x-y-z coordinate system. The z-axis, or visual axis, projects outwards from the foveal center 372 towards the center of the user's visual field. Generally, when the user is looking at a point in the external environment, the visual axis 502 (or center of the user's gaze) is what the user perceives as the center of his visual field. The visual axis intersects an x-y plane at the center of the fovea.

The x-axis 504 and y-axis 506 of FIG. 5A are orthogonal axes for the user's visual field. The x-axis 504 corresponds to a "horizontal" orientation and the y-axis 506 corresponds to a "vertical" orientation. That is, when a user's head is not tilted, horizontal lines in the external environment appear in the users visual field as parallel to the x-axis and vertical lines in the external environment appear in the user's visual field as parallel to the y-axis. These axes are drawn as straight dashed lines in FIG. 5A. In the remaining figures, the x- and y-axes are shown as dashed lines, and the origin of the x-y plane (i.e., where the visual axis 502 intersects the x-y plane) is marked by a solid dot.

Figure 5B:
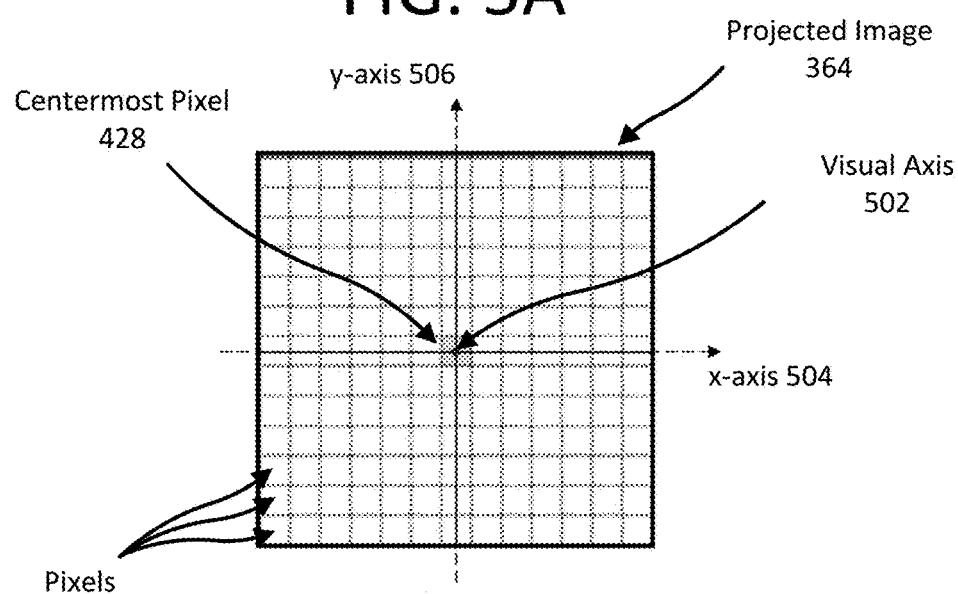
FIG. 5B illustrates an aligned contact lens display.

FIG. 5B shows an example image projected onto a retina. The projected image 364 of FIG. 5B is shown as a large bounded square including many smaller squares. The projected image is overlaid on the x-y axes of the user's visual field, and the dot at the center of the dashed crosshairs represents the visual axis 502. Although not illustrated, the retina 358 can also receive an image of the environment and, accordingly, the user's visual field includes the projected image 364 overlaid onto the image of the environment.

The projected image 364 can be from a single femtoprojector or from multiple femtoprojectors, each of which includes an image source 312 with multiple pixels 426. The individual pixels 426 are illustrated as small squares within the projected image 364. The pixel at the center of the projected image 364, or centermost pixel 428, is highlighted. Because the visual axis 502 is aligned with the centermost pixel 428 in FIG. 5B, the vertical and horizontal cross-hairs intersect the center pixel. Note that the centermost pixel 428 is the pixel at the center of the projected image 364, and is not necessarily the pixel at the center of the pixel array of the contact lens.

In the example of FIG. 5B, the contact lens 120 is aligned relative to the user's visual axis 502. The contact lens 120 is aligned when the centermost pixel 428 of the projected image 364 is projected to a point on the retina 358 corresponding to the visual axis 502 (i.e., the foveal center 372).

Figure 5C:
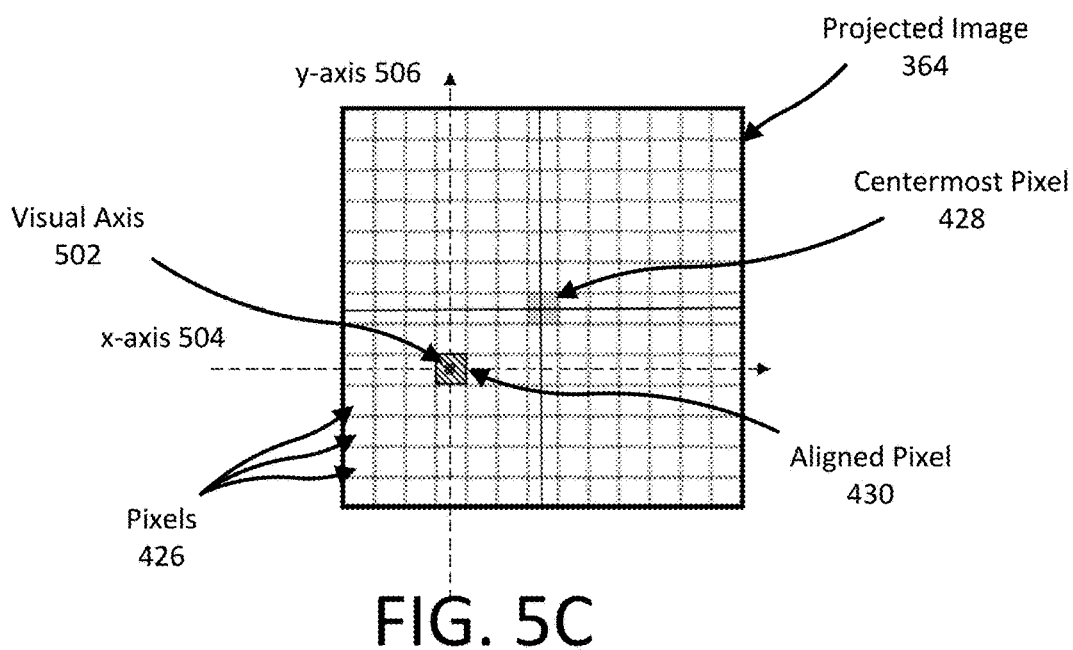
FIG. 5C illustrates a misaligned contact lens display.

FIG. 5C illustrates a misaligned contact lens 120. The contact lens 120 is misaligned when the centermost pixel 428 of the projected image 364 is projected to a point on the retina 358 that does not correspond to the visual axis 502. Here, the visual axis 502 is offset from the centermost pixel by several pixels relative to the aligned pixel 430. More explicitly, the aligned pixel 430 is two pixels 426 below and three pixels 426 to the left of the centermost pixel.

A calibration process can be implemented to align the image source of a contact lens 120 relative to a user's visual axis 502. The calibration process can determine an alignment for the contact lens 120 and can compensate for misalignment when subsequently projecting image data. For example, if a contact lens 120 is physically misaligned relative to a user's visual axis 502, image data 422 may not be correctly projected relative to the user's visual axis 502. However, the contact lens 120 can be calibrated based on the determined alignment. For instance, the display shift system 420 can shift the location from which the image data 422 is projected based on the determined alignment such that the image data 422 is correctly projected relative to the user's visual axis 502.

Figure 6:
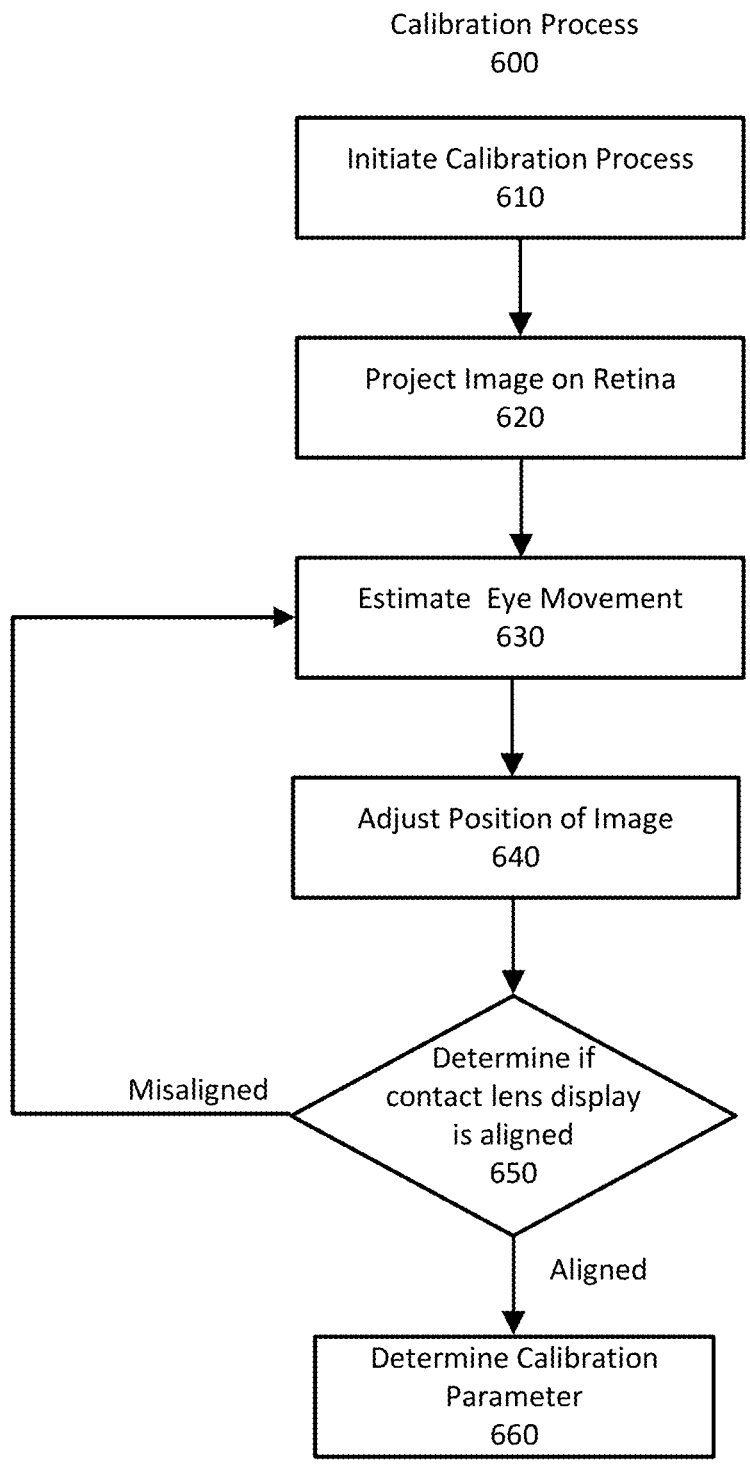
FIG. 6 is a flow chart for a method to calibrate a contact lens display relative to a user's visual axis.

FIG. 6 is a flow diagram of an example method for calibrating the alignment of a contact lens 120 image source relative to a visual axis 502. The method can include additional or fewer steps, and the steps may be executed in any order.

To begin, the calibration process 600 is initiated 610. There can be any number of methods to initiate 610 the calibration process. For example, the calibration system 400 may determine that the contact lens 120 is misaligned based on detected motion of the eye and may initiate 610 the calibration process 600 in response. Likewise, a user of the AR system may initiate 610 the calibration process 600 with an input (such as with a gesture, voice command, or interaction with an electronic device), the calibration process 600 may automatically initialize 610 when the user powers on the AR system 100, or the calibration process 600 may initialize 610 periodically or after a defined period of time (e.g., after 4 hours of use).

After the calibration process 600 is initialized 610, the AR system projects 620 a calibration image onto the retina 358. The calibration image can include a centermost pixel 428, and the user can be prompted to look at the centermost pixel. In one example, the calibration image is a cross-hairs and the center of the cross-hairs is the centermost pixel 428. In some embodiments, the calibration image is a single pixel. In other examples, the calibration image can be any other image having an easily determinable image center. In a situation where the contact lens 120 is aligned, the center of the calibration image (i.e., the centermost pixel) is aligned to the user's visual axis 502, but when the contact lens 120 is misaligned, the center of the calibration image is not aligned with the user's visual axis 502.

Next, the user moves their eye to turn their visual field towards the calibration image. The motion detection system 410 detects 630 the motion of the eye as it moves. In various circumstances, the user may adjust their visual field consciously or subconsciously. For example, the AR system 100 may prompt the user to direct his visual axis 502 towards a projected 620 calibration image and in response, the user consciously looks towards the calibration image. In another example, the AR system 100 projects 620 the calibration image and the user directs his visual axis towards the calibration image because the calibration image subconsciously draws the user's attention. Whatever the case, the motion detection system 410 detects the eye's motion as the user changes the direction of his visual axis towards the calibration image.

Next, the calibration system 400 determines a motion characteristic based on the detected eye motion. The motion characteristic can be any scalar quantity or vector quantity quantifying the detected motion. For example, the motion characteristic may be an acceleration magnitude detected by an accelerometer in the contact lens 120 or may be a velocity and direction detected by a magnetic positioning system in the contact lens 120. Additionally, the motion characteristic can be a differential motion. That is, the motion characteristic can be a change between two subsequently detected motions. For example, the motion characteristic can be the change in acceleration from an acceleration sensed at a first time and an acceleration sensed at a second time.

The motion characteristic may also be a type of motion based on the detected motion. For example, the calibration system 400 can determine that the motion characteristic is smooth motion or saccade motion based on the sensed motion. Smooth motion, such as floater chase motion, is a slow motion of the eye as a user tracks an object through the visual field. Saccade motions are small jittery motions of the eye that subconsciously occur when the eye focuses on an object in the visual field. Generally, smooth motion can indicate that the user is still aligning the user's visual axis 502 with the calibration image while saccade motion indicates that the calibration image is already aligned with the user's visual axis.

Next, the display shift system 420 adjusts 640 the position of the calibration image by shifting which pixel(s) 426 project the calibration image onto the retina 358 based on the detected motion. That is, the display shift system 420 changes the projection location of the centermost pixel 428 of the calibration image. Thus, the calibration image is projected onto a different portion of the user's retina and, as a result, the location of the calibration image shifts within the user's visual field. For example, if the detected motion of the user's eye is in a first direction, the calibration image can be shifted in a second direction opposite the first direction. In another example, if the user's gaze shifts three pixels to the right, the calibration image can be projected three pixels to the left of the pixel from which the calibration image was initially projected.

In general, adjusting 640 the position of the calibration image based on a detected eye motion reduces the misalignment of the contact lens 120 image source. That is, after adjusting 640 the position of the calibration image, the center of the adjusted calibration image is more closely aligned with the visual axis 502. In some instances, adjusting 640 the position of the calibration image may unintentionally increase the misalignment. However, the calibration system can iteratively detect 630 motion and adjust 640 the position of the calibration image such that, over time, the contact lens 120 image source becomes aligned with the user's visual axis 502. For example, in the event that adjusting 640 the position of the calibration image increases misalignment (e.g., the amount of detected eye motion in response to the calibration image increases), the adjusted position of the calibration image can be determined to be further from alignment than an initial position of the calibration image. In such instances, the position of the calibration image can again be adjusted to be closer to the initial position than the adjusted position.

At some point during the calibration process 600, the calibration system 400 may determine 650 that the contact lens 120 image source is aligned. The contact lens 120 image source is aligned when the center of the projected image is aligned with the visual axis. The calibration system determines 650 that the contact lens 120 image source is aligned based on the motion of the eye detected in response to the calibration image. In one example, the calibration system 400 compares a characteristic of the motion (such as a magnitude of the detected motion) to a corresponding motion characteristic threshold representative of an aligned contact lens image source. In this example, if the detected motion characteristic is within the motion characteristic threshold, the contact lens 120 is determined to be aligned and the location of subsequently displayed images is not adjusted further. The calibration system 400 can determine that the contact lens 120 image source is aligned in response to receiving a corresponding verbal or non-verbal indication from the user, detecting a hand or eye gesture of the user, or receiving an input on a device coupled to the contact lens (such as a necklace or a mobile phone).

In another example, the calibration system 400 determines that the contact lens 120 image source is aligned if the motion characteristic is indicative of eye motion corresponding to an aligned system (e.g., saccade motion). In yet another example, the calibration system 400 determines that the contact lens 120 image source is misaligned if the motion characteristic is indicative of eye motion corresponding to a misaligned system (e.g., smooth pursuit motion). In such an example, the calibration system 400 determines that in the absence of smooth pursuit motion, the contact lens 120 image source is aligned.

It should be noted that the calibration system 400 can determine that the contact lens 120 image source is misaligned in response to eye motion being detected within a threshold amount of time (e.g., ~10 ms) of displaying a calibration image. Eye motion detected after the threshold amount of time has passed may be disregarded, as it may be in response to stimulus other than the calibration image. In some embodiments, the calibration system 400 can determine that the contact lens 120 image source is misaligned in response to detecting net eye motion over an interval of time (such as 200 ms to 500 ms), and can determine that the contact lens 120 image source is aligned in response to detecting no net eye motion over the interval of time. In some embodiments, the calibration system 400 aligns the contact lens 120 image source in response to motion of the user's eye that falls within a frequency band of 0 Hz to 50 Hz.

Once the contact lens 120 is aligned, the calibration process 600 determines 660 a calibration parameter associated with the alignment. In one example, the calibration parameter is the location of an aligned pixel (e.g., the pixel that corresponds to the user's visual axis). In another example, the calibration parameter is an amount of pixel offset between the projection location of the aligned pixel and the projection location of an initial centermost pixel (e.g., the pixel thought to correspond to the user's visual axis prior to calibrating the contact lens).

After calibration, the calibration parameter is used by the display shift system 420 to project subsequent images onto the retina 358 such that the contact lens 120 is aligned. For example, for an image to be projected in alignment with the user's visual axis, the centermost pixel of the image can be projected at a projector location determined during calibration to correspond to the user's visual axis (e.g., the aligned pixel). In this example, the calibration parameter is the pixel location of the aligned pixel. Similarly, if the calibration parameter is a pixel offset from an initial projection location determined to correspond to the user's visual axis, the display shift system 420 can shift a subsequent image by the pixel offset. In either case, the projected image is aligned with the visual axis 502 despite the contact lens being initially misaligned.

Once calibration is completed, the calibration parameter can be stored as part of a user's profile for the eye-mounted display. In addition, calibration results over time can be recorded and analyzed to identify calibration patterns for a user, for a population of users, or for particular models of contact lens.

FIGS. 7A-7D show an example of a calibration process 600 using an AR system 100 that does not hold a virtual object stationary in the user's visual field. In other words, the virtual object is consistently projected onto a stationary location of the user's retina.

Figure 7A:
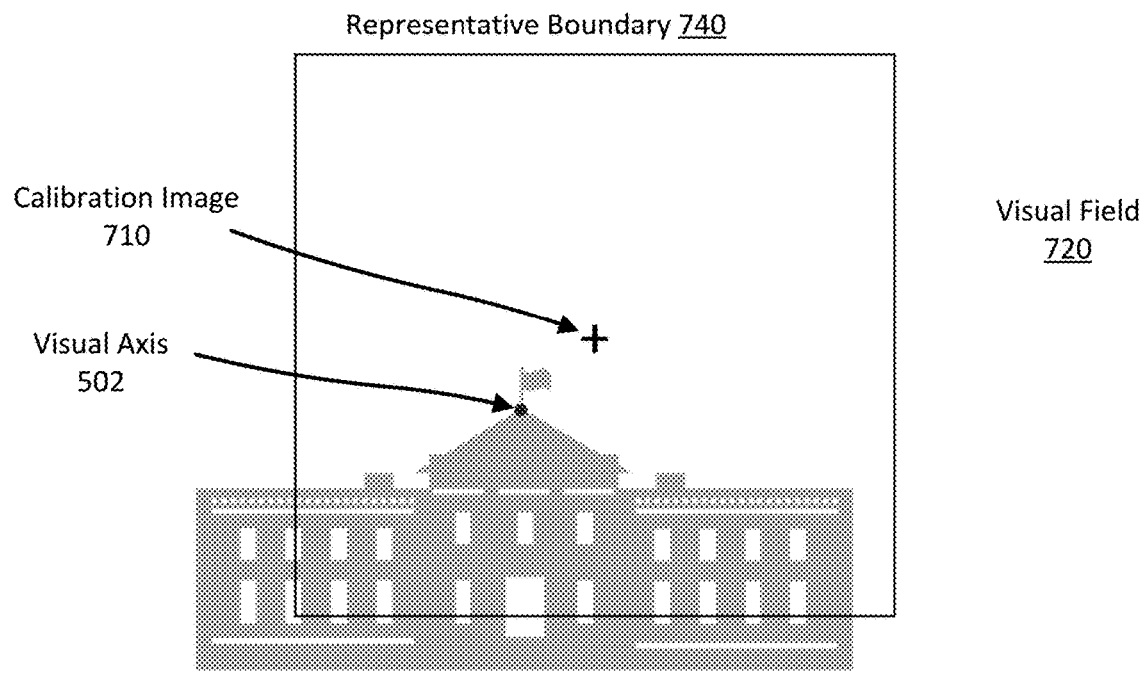
FIGS. 7A-7D illustrate an example of a calibration process using an augmented reality system that does not hold a virtual object stationary in the user's visual field.

In the example of FIGS. 7A-7D, a user of the AR system is in Washington, D.C., looking at the White House. In FIG. 7A, the user notices that the contact lens 120 is misaligned. Before initiating 610 the calibration process 600, the user focuses the user's visual axis 502 (indicated by a dot) on the center peak of the White House roof such that the White House is in the user's visual field 720.

When initiating 710 the calibration process 700, the AR system 100 instructs a contact lens projector to display a calibration image 710 onto the user's retina 358. The AR system then instructs the user to focus on the calibration image 710 (for instance, via a speaker included within the necklace 110). Because the contact lens 120 is misaligned, the calibration image 710 is not aligned with the visual axis 502 of the user. In this example, the calibration image 710 is a small cross-hairs whose center is projected from an initial pixel of the image source 312. For reference, a representative boundary 740 of the image source 312 is also illustrated (as a large box), although the user may not see the boundary.

Figure 7B:
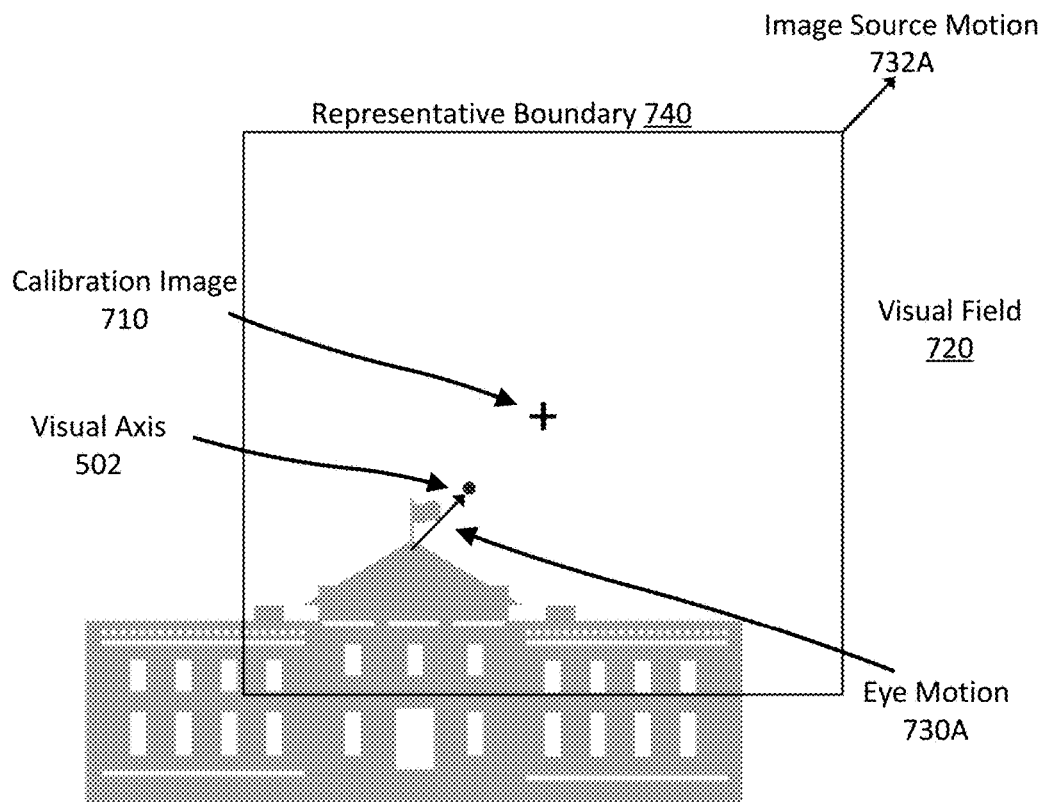

In FIG. 7B, the user's eye rotates upwards and to the right to look at the calibration image 710. The rotation of the user's eye causes the visual axis of the eye to move (indicated by arrow 730A). The image source 312 similarly moves (arrow 732A). Because the AR system 100 does not keep the calibration image 710 stationary in the user's visual field 720, the calibration image 710 also moves upwards and to the right.

The motion detection system 410 detects the eye's motion and determines a motion characteristic representative of the detected motion. In this example, the motion characteristic is the magnitude of acceleration of the eye when the user attempts to look at the calibration image 710. The display shift system 420 can adjust the projection location of the calibration image 710 based on the magnitude of acceleration. Alternatively, the motion characteristic can indicate that the motion of the user's eye is "smooth motion" in response to the magnitude of the acceleration of the eye corresponding to acceleration representative of smooth motion.

In some embodiments, the motion of the user's eye can be determined to be smooth motion in response to an acceleration of the eye being below an acceleration threshold, in response to a velocity of the eye being below a velocity threshold, in response to the motion of the user's eye being performed over a time interval greater than a threshold time interval, in response to the motion of the eye being a linear motion, in response to the motion of the eye being relatively constant (e.g., where the ratio of vector standard deviation over a time interval and the mean value of eye velocity over the time interval is less than 0.1), in response to the motion of the eye being floater chase motion, or in response to the motion of the eye including fewer than a threshold number of jump motions. In response to determining that the eye motion is smooth motion, the display shift system 420 can adjust the projection location of the calibration image based on the detected motion. In contrast, in response to determining that the eye motion is not smooth motion, the calibration system 400 can determine that the contact lens is already calibrated, or can ignore the detected motion entirely.

Figure 7C:
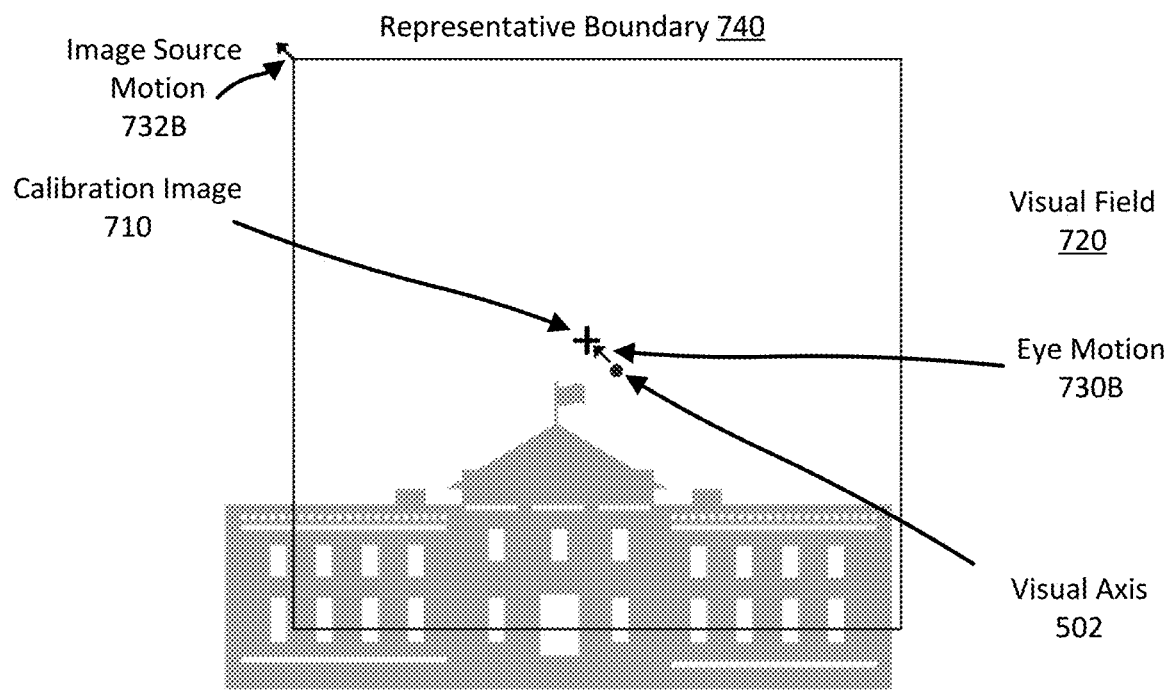

FIG. 7C illustrates the location of the adjusted calibration image 710 in the user's visual field 720. The contact lens 120 is still misaligned, albeit to a smaller degree. The calibration image 710 is now located to the left and above the users visual axis 502. The user's eye moves upwards and to the left in an attempt to look at the calibration image 710. The second motion of the visual axis is indicated by arrow 730B, and the second motion of the image source 312 is indicated by arrow 732B.

The motion detection system 410 detects the second eye motion and determines a second motion characteristic representative of the detected second motion. In this instance, because the magnitude of acceleration of the user's eye is smaller than the iteration illustrated in FIGS. 7A and 7B, the display shift system 420 adjusts 640 the projection location of the calibration image 710 to a smaller degree.

Figure 7D:
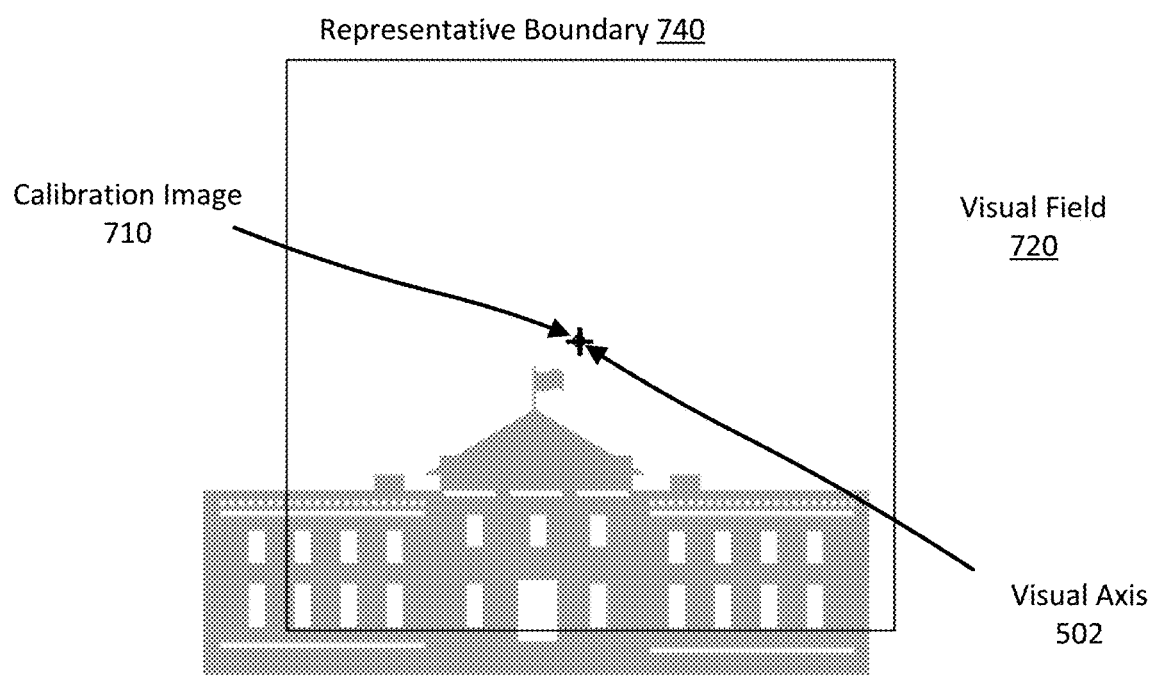

FIG. 7D illustrates the location of the second adjusted calibration image 710 in the user's visual field. In this example, the contact lens 120 is aligned because the user's visual axis 502 is aligned with the center of the calibration image 710. Because the calibration image 710 is centered on the user's visual axis 502, the user's eye motion effectively stops. Thus, motion characteristics representative of subsequently detected motions may drop below a threshold corresponding to misalignment, or may indicate saccade motion, and the calibration system 400 determines 650 that the contact lens 120 is aligned. The calibration system 400 can determine 660 a calibration parameter, such as the pixel offset between the projection locations of the center of the calibration image 710 in FIG. 7A and FIG. 7D.

Figure 8A:
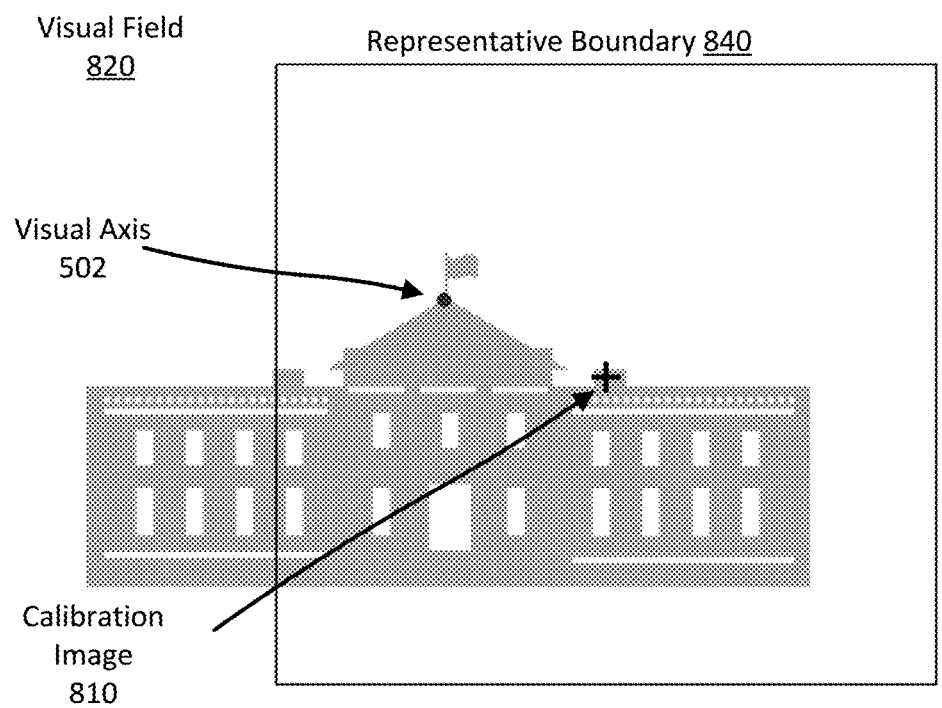
FIGS. 8A-8C illustrate an example of a calibration process using an augmented reality system that holds a virtual object stationary in the user's visual field.
Figure 8B:
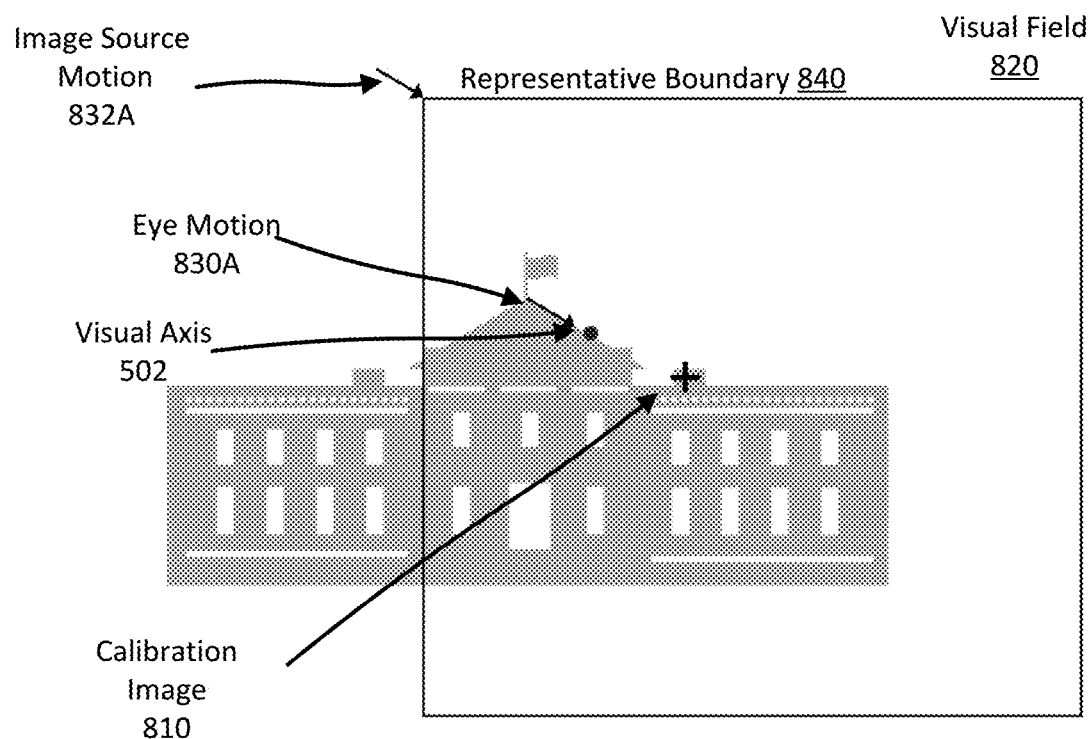
Figure 8C:
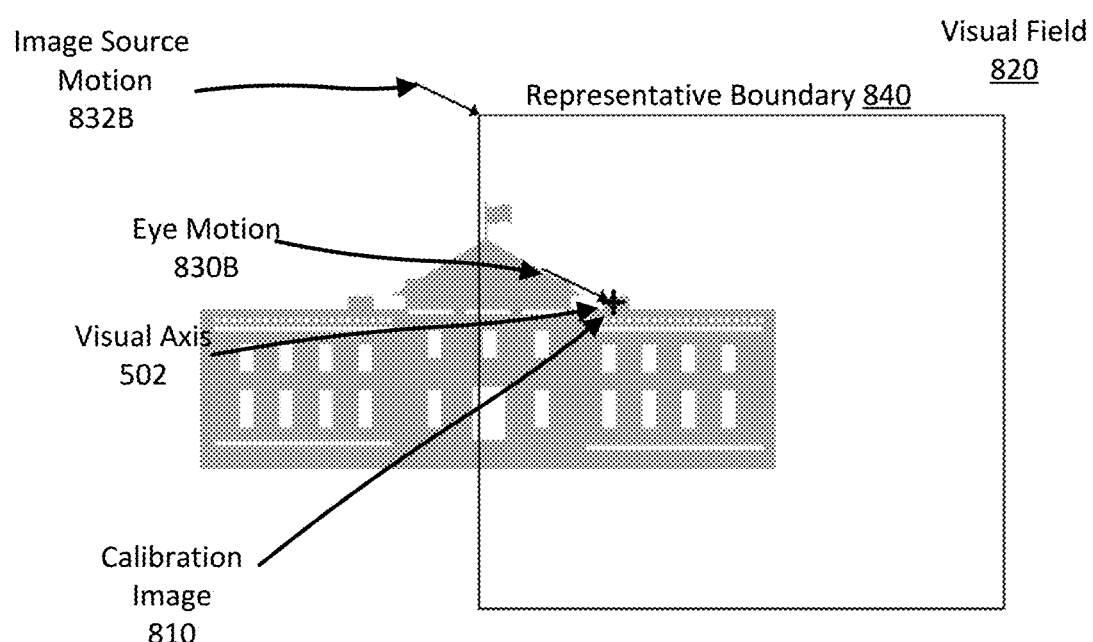

FIG. 8A-8C show an example of a calibration process 600 using an AR system 100 that holds a virtual object stationary relative to an external environment within the user's visual field.

As shown in FIG. 8A, the user's visual field 820 again includes the White House, and the user's visual axis 502 is centered on the peak at the center of the White House roof. A representative boundary 840 of the image source 312 is illustrated. The calibration system 400 determines that the contact lens 120 is misaligned based on eye motions sensed by the motion detection system 410. The contact lens 120 displays the message "Calibration necessary, initiating calibration" in the user's visual field 820. After displaying the message the calibration system initiates 610 the calibration process 600 by projecting a calibration image onto the user retina. Because the contact lens 120 is misaligned, the calibration image 810 is displayed on a stone outcrop rather than the visual axis 502.

In FIG. 8B, the user's eye rotates downwards and to the right to look at the calibration image 810. The rotation of the user's eye causes the visual axis of the eye to move (indicated by arrow 830A). The image source 312 moves in a corresponding manner (indicated by arrow 832A). Because the AR system 100 keeps the calibration image 810 stationary relative to the external environment within the user's visual field 820, shifting the user's gaze does not affect the location of the calibration image 810. In some cases, this is because the display shift system 420 adjusts the projection location of the calibration image 810 based on the sensed 630 motion of the eye. Generally, the display shift system 420 will shift the projection location in the opposite direction of the sensed motion. That is, if the eye moves down and to the right, the projection location of the calibration image shifts up and to the left. In FIG. 8B, the visual axis of the user is still not completely aligned with the calibration image.

In FIG. 8C, the user's eye rotates further downwards and to the right to look at the calibration image 810. The calibration image 810 is held stationary relative to the user's external environment, and thus remains on the stone outcropping of the White House. However, the user's eye has now fully rotated towards the calibration image 810 such that the visual axis 502 of the user is aligned with the calibration image. The second motion of the visual axis is indicated by arrow 830B, and the second motion of the image source 312 is indicated by arrow 832B.

After a period of time during which no subsequent eye motion is detected, the calibration system 400 can determine that the user's visual axis is aligned with the calibration image 810, and can determine a calibration parameter based on the sum of the eye motions 830A and 830B. For instance, the calibration system 400 can determine a pixel offset representative of the sum of the eye motions, and can display subsequent images at the pixel offset relative to the initial image source location from which the calibration image 810 was projected (e.g., the image source location corresponding to the calibration image 810 in FIG. 8A). Alternatively, the calibration system 400 can determine that the image source location from which the calibration image 810 is projected (e.g., the image source location corresponding to the calibration image 810 in FIG. 8C) corresponds to user's visual axis, and display subsequent images relative to the determined image source location.

Although the detailed description contains many specifics, these should not be construed as limiting the scope of the invention but merely as illustrating different examples. It should be appreciated that the scope of the disclosure includes other embodiments not discussed in detail above. For example, the technologies described are applicable to eye-mounted displays other than the specific types described above. Examples include displays in contact lenses other than scleral contact lenses, and also intraocular displays. Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

What is claimed is:

1. A method for calibrating an alignment of an eye-mounted display relative to a user's visual axis, the eye-mounted display comprising an image source, the method implemented on a system and comprising:
projecting a first calibration image and then a second calibration image from the image source onto the user's retina, the second calibration image projected from a different location within the image source than the first calibration image;
detecting a first motion of the user's eye after projecting the first calibration image, and a second motion of the user's eye after projecting the second calibration image;
in response to the detected motions of the user's eye being smooth pursuit motion, determining a calibration property for the image source based on the detected motions.

2. The method of claim 1, wherein at least one of the detected motions comprise an acceleration, and wherein the motion of the user's eye is determined to be smooth pursuit motion in response to the acceleration of the detected motion being less than a threshold acceleration.

3. The method of claim 1, wherein at least one of the detected motions comprise a velocity, and wherein the motion of the user's eye is determined to be smooth pursuit motion in response to the velocity of the detected motion being less than a threshold velocity.

4. The method of claim 1,
wherein the detected first motion is performed over a first time interval and the detected second motion is performed over a second time interval, the method further comprising:
in response to the first time interval or the second time interval of the detected motions being greater than a threshold time interval, determining the detected motions are smooth pursuit motion.

5. The method of claim 1, wherein the detected motions of the user's eye are determined to be smooth pursuit motion in response to at least one of the detected motions of the user's eye comprising a linear motion.

6. The method of claim 1, wherein the detected motions of the user's eye are determined to be smooth pursuit motion in response to at least one of the detected motions of the user's eye comprising floater chase motion.

7. The method of claim 1, wherein the detected motions of the user's eye are determined to not be smooth pursuit motion in to at least one of the detected motions of the user's eye comprising saccade motion.

8. The method of claim 7, wherein the detected motions of the user's eye are determined to be saccade motion in response to at least one of the detected motions of the user's eye comprising jump motions.

9. The method of claim 1, wherein the eye-mounted display includes a motion-detection component configured to detect the motion of the user's eye.

10. The method of claim 9, wherein the motion-detection component comprises one or more of: an accelerometer, a gyroscope, an inertial measurement unit, and a magnetic measurement unit.

11. The method of claim 9, wherein the motion-detection component is configured to output data representative of the detected motion, and wherein the characteristic of the detected motion is based on the outputted data representative of the detected motion.

12. The method of claim 9, wherein the motion-detection component is configured to detect at least one of a magnitude of the detected motion and a direction of the detected motion.

13. The method of claim 1, wherein the calibration property comprises a location of a pixel within the image source that corresponds to the visual axis of the user.

14. The method of claim 1, wherein the calibration property comprises an offset within the image source between a pixel within the image source that corresponds to the calibration image and a pixel within the image source determined to correspond to a center of the user's visual axis.

15. The method of claim 1, wherein the calibration property is determined based on one or both of: a magnitude of at least one of the detected motions and a direction of at least one of the detected motions.

16. The method of claim 1, further comprising projecting a subsequent image from the image source based on the calibration property such that a center of the subsequent image aligns with the user's visual axis.

17. The method of claim 1, wherein determining the calibration property for the image source comprises:

in response to the detected second motion being greater in magnitude than the detected first motion, determining that a location within the image source that corresponds to a center of the user's visual axis is closer to the location from which the second calibration image is projected than the location from which the first calibration image was projected.

18. The method of claim 1, wherein determining the calibration property for the image source comprises:
in response to the detected first motion being greater in magnitude than the detected second motion, determining that a location within the image source that corresponds to a center of the user's visual axis is closer to the location from which the first calibration image was projected than the location from which the second calibration image is projected.

19. A method for calibrating an alignment of an eye-mounted display relative to a user's visual axis, the eye-mounted display comprising an image source, the method implemented on a system and comprising:
projecting a first calibration image and then a second calibration image from the image source onto the user's retina, the second calibration image projected from a different location within the image source than the first calibration image;
detecting a first motion of the user's eye after projecting the first calibration image, and a second motion of the user's eye after projecting the second calibration image;
in response to determining that the detected motions are in response to the calibration images, determining a calibration property for the image source based on the detected motions.

20. The method of claim 19, wherein the detected motions are determined to be in response to the calibration image if the detected motions occur within a threshold time after projecting their corresponding calibration image.

21. The method of claim 19, wherein at least one of the detected motions is determined to be in response to its corresponding calibration image if the corresponding detected motion of the user's eye is floater chase motion.

22. The method of claim 19, wherein at least one of the detected motions is determined to not be in response to its corresponding calibration image in response to determining that the corresponding detected motion of the user's eye is saccade motion.

23. The method of claim 19, wherein the calibration property comprises a pixel within the image source that corresponds to the visual axis of the user.

24. A method for calibrating an alignment of an eye-mounted display relative to a user's visual axis, the eye-mounted display comprising an image source, the method implemented on a system and comprising:
projecting a first calibration image and then a second calibration image from the image source onto the user's retina, the second calibration image projected from a different location within the image source than the first calibration image;
detecting a first motion of the user's eye after projecting the first calibration image, and a second motion of the user's eye after projecting the second calibration image;
in response to determining that the detected motions are not saccade motion, determining a calibration property for the image source based on the detected motions.

25. An electronic contact lens comprising:
a display comprising one or more projectors configured to project images onto a user's retina;
a power source configured to provide power to components of the electronic contact lens;
a motion detection system configured to detect motion of the user's eye; and
a controller configured to calibrate an alignment of the display relative to the user's visual axis by:
causing the display to project a first calibration image then a second calibration image onto the user's retina, the second calibration image projected from a different location within the display than the first calibration image; and
responsive to the motion detection system determining that a first detected motion of the user's eye in response to the first calibration image and a second detected motion of the user's eye in response to the second calibration image are smooth pursuit motion, determining a calibration property for the display based on the detected motions.

* * * * *